(12) United States Patent
Zhang et al.

(10) Patent No.: US 11,921,390 B2
(45) Date of Patent: Mar. 5, 2024

(54) ARRAY SUBSTRATE, MANUFACTURING METHOD THEREOF AND DISPLAY DEVICE

(71) Applicant: BOE Technology Group Co., Ltd., Beijing (CN)

(72) Inventors: Jian Zhang, Beijing (CN); Zhen Wang, Beijing (CN); Deshuai Wang, Beijing (CN); Han Zhang, Beijing (CN); Wei Yan, Beijing (CN); Jian Sun, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 329 days.

(21) Appl. No.: 17/427,622

(22) PCT Filed: Oct. 22, 2020

(86) PCT No.: PCT/CN2020/122695
§ 371 (c)(1),
(2) Date: Jul. 30, 2021

(87) PCT Pub. No.: WO2022/082564
PCT Pub. Date: Apr. 28, 2022

(65) Prior Publication Data
US 2022/0317535 A1 Oct. 6, 2022

(51) Int. Cl.
*G02F 1/1362* (2006.01)
(52) U.S. Cl.
CPC .............................. *G02F 1/136295* (2021.01)
(58) Field of Classification Search
CPC ......... G02F 1/136295; G02F 1/136272; G02F 1/136286; G06F 3/041
See application file for complete search history.

(56) References Cited

U.S. PATENT DOCUMENTS

| 2016/0299614 | A1 | 10/2016 | Yang et al. |
| 2017/0270847 | A1 | 9/2017 | Jin |
| 2020/0117313 | A1* | 4/2020 | Zhang .................. G06F 3/0446 |
| 2021/0247867 | A1* | 8/2021 | Wang .................. G06F 3/0446 |

FOREIGN PATENT DOCUMENTS

| CN | 103955309 A | 7/2014 |
| CN | 104142593 A | 11/2014 |
| CN | 106409208 A | 2/2017 |
| KR | 20080086273 A | 9/2008 |

\* cited by examiner

*Primary Examiner* — Tracie Y Green
(74) *Attorney, Agent, or Firm* — IPro, PLLC

(57) ABSTRACT

The present disclosure provides an array substrate, a manufacturing method thereof and a display device. The array substrate includes: a display area and a peripheral area surrounding the display area; the display area is provided with a plurality of gate lines and a plurality of data lines, the gate lines and the data lines are crossed to define a plurality of sub-pixel regions distributed in an array; a first electrode, the first electrode including a first portion located in the display area and a second portion located in the peripheral area; an electrode connection line, the electrode connection line is located in the peripheral area, the electrode connection line is electrically connected to the second portion; a plurality of compensation signal lines, at least part of the compensation signal lines are located in the display area, and the compensation signal lines are electrically connected to the first portion.

13 Claims, 5 Drawing Sheets

ARRAY SUBSTRATE, MANUFACTURING METHOD THEREOF AND DISPLAY DEVICE

CROSS-REFERENCE TO RELATED APPLICATION

This application is the U.S. national phase of PCT Application No. PCT/CN2020/122695 filed on Oct. 22, 2020, the disclosures of which is incorporated in its entirety by reference herein.

TECHNICAL FIELD

The present disclosure relates to the field of display technology, and in particular to an array substrate, a manufacturing method thereof and a display device.

BACKGROUND

With the continuous development of display technology, the application range of display products is becoming wider and wider. A display product typically includes a display panel and a driving chip located on one side of the display panel. The driving chip is used to provide the display panel with various functional signals required for its display. For large-size display products, the functional signal needs to go through a long transmission path to be able to be transmitted from a side of the display panel close to the driving chip to a side away from the driving chip.

SUMMARY

An object of the present disclosure is to provide an array substrate, a manufacturing method thereof and a display device.

A first aspect of the present disclosure provides an array substrate, including: a display area and a peripheral area surrounding the display area; the display area is provided with a plurality of gate lines and a plurality of data lines, the gate lines and the data lines are crossed to define a plurality of sub-pixel regions distributed in an array; the array substrate further includes:
  a first electrode, the first electrode including a first portion located in the display area and a second portion located in the peripheral area;
  an electrode connection line, the electrode connection line is located in the peripheral area, the electrode connection line is electrically connected to the second portion, and is configured to provide a first signal for the first electrode;
  a plurality of compensation signal lines, at least part of the compensation signal lines are located in the display area, and the compensation signal lines are electrically connected to the first portion.

Optionally, the plurality of sub-pixel regions are divided into multiple rows of sub-pixel regions, and the compensation signal lines correspond to at least one row of sub-pixel regions in a one-to-one manner;
  at least part of the compensation signal lines are located in a corresponding row of sub-pixel regions, and in a corresponding row of sub-pixel regions, the compensation signal lines are electrically connected to the first portion through at least one first via structure.

Optionally, each row of sub-pixel regions can form a plurality of pixel regions, and each of the pixel regions includes at least two adjacent sub-pixel regions; the compensation signal lines are electrically connected to the first portion through a plurality of first via structures, and the plurality of first via structures are distributed in the plurality of pixel regions formed by a corresponding row of sub-pixel regions in a one-to-one correspondence.

Optionally, the pixel region includes a first sub-pixel region, a second sub-pixel region, and a third sub-pixel region,
  the first via structure in the pixel region is located in a first sub-pixel region included in the pixel region.

Optionally, the first via structure includes: a first via, a second via, and a first conductive pattern;
  the first conductive pattern is located between the compensation signal lines and the first portion, the compensation signal lines are electrically connected to the first conductive pattern through the first via, and the first conductive pattern is electrically connected to the first portion through the second via.

Optionally, the compensation signal lines include a third portion and a fourth portion, a width of the third portion is greater than a width of the fourth portion along a direction perpendicular to an extension direction of the compensation signal lines, and an orthographic projection of the first via on a base of the array substrate overlaps an orthographic projection of the third portion on the base; and/or an orthographic projection of the second via on the base overlaps the orthographic projection of the third portion on the base.

Optionally, the first conductive pattern and the data lines are provided in the same layer and are made of same material.

Optionally, an extension direction of the compensation signal lines is the same as an extension direction of the gate lines, and the compensation signal lines and the gate lines are provided in the same layer and are made of same material.

Optionally, the array substrate further includes:
  a plurality of second electrodes, the second electrodes are located in the plurality of sub-pixel regions in a one-to-one correspondence, and the second electrodes are located on a side of the first electrodes facing away from the base of the array substrate; the first electrodes are provided with a plurality of openings corresponding to the plurality of second electrodes in a one-to-one manner;
  a plurality of driving circuits corresponding to the plurality of second electrodes in a one-to-one manner, the driving circuit is located between a corresponding second electrode and the base of the array substrate, and a driving signal output terminal of the driving circuit is electrically connected to a corresponding second electrode through a second via structure; the second via structure includes a third via, a fourth via, and a second conductive pattern, and the second conductive pattern is located between the driving signal output terminal and the second electrodes; the driving signal output terminal is electrically connected to the second conductive pattern through the third via, and the second conductive pattern is electrically connected to a corresponding second electrode through the fourth via; an orthographic projection of the fourth via on the base of the array substrate is surrounded by an orthographic projection of a corresponding opening on the base.

Optionally, the array substrate further includes:
a plurality of second electrodes, the second electrodes are located in the plurality of sub-pixel regions in a oneto-one correspondence, and the second electrodes are located between the first electrodes and the base of the array substrate;

a plurality of driving circuits corresponding to the plurality of second electrodes in a one-to-one manner, the driving circuit is located between a corresponding second electrode and the base of the array substrate, and a driving signal output terminal of the driving circuit is electrically connected to a corresponding second electrode.

Optionally, the array substrate further includes a first signal input terminal disposed on a first side of the first electrode;

the second portion surrounds the first portion, the second portion includes a first sub-portion, a second sub-portion, and a third sub-portion, the second sub-portion is located between the first sub-portion and the third sub-portion along an extension direction of the data lines;

the electrode connection line includes:

a first electrode connection line, the first electrode connection line is electrically connected to the first sub-portion and the first signal input terminal, respectively;

a second electrode connection line, the second electrode connection line is electrically connected to the second sub-portion and the first signal input terminal, respectively;

a third electrode connection line, the third electrode connection line is electrically connected to the third sub-portion and the first signal input terminal, respectively;

Optionally, the electrode connection line includes a plurality of the first electrode connection lines, and the plurality of the first electrode connection lines are arranged in sequence along an extension direction of the gate lines;

the electrode connection line includes two second electrode connection lines, one second electrode connection line is located on a third side of the first electrode, and the other second electrode connection line is located on a fourth side of the first electrode, the third side and the fourth side are opposite along the extension direction of the gate lines;

the third electrode connection line surrounds the second, third, and fourth sides of the first electrode, and the second side and the first side are opposite along the extension direction of the data lines, and the third electrode connection line is electrically connected to both ends of the third sub-portion along the extension direction of the gate lines, respectively.

Based on the above technical solution of the array substrate, a second aspect of the present disclosure provides a display device including the above array substrate.

Optionally, the display device further includes a color filter substrate and a liquid crystal layer, the color filter substrate is arranged opposite to the array substrate, and the liquid crystal layer is located between the color filter substrate and the array substrate.

Based on the above technical solution of the array substrate, a third aspect of the present disclosure provides a manufacturing method of an array substrate, the array substrate including a display area and a peripheral area surrounding the display area; the manufacturing method includes:

fabricating a plurality of gate lines and a plurality of data lines, the gate lines and the data lines are crossed to define a plurality of sub-pixel regions distributed in an array;

fabricating a first electrode, the first electrode including a first portion located in the display area and a second portion located in the peripheral area;

fabricating an electrode connection line, the electrode connection line is located in the peripheral area, the electrode connection line is electrically connected to the second portion, and is configured to provide a first signal for the first electrode;

fabricating a plurality of compensation signal lines, at least part of the compensation signal lines are located in the display area, and the compensation signal lines are electrically connected to the first portion.

BRIEF DESCRIPTION OF THE DRAWINGS

The following drawings are provided to facilitate the understanding of the present disclosure, and constitute a portion of the present disclosure. These drawings and the following embodiments are for illustrative purposes only, but shall not be construed as limiting the present disclosure. In these drawings.

DETAILED DESCRIPTION

In order to further illustrate a array substrate, a manufacturing method of the array substrate and a display device according to embodiments of the present disclosure, a detailed description will be given below with reference to the accompanying drawings.

Figure 1:
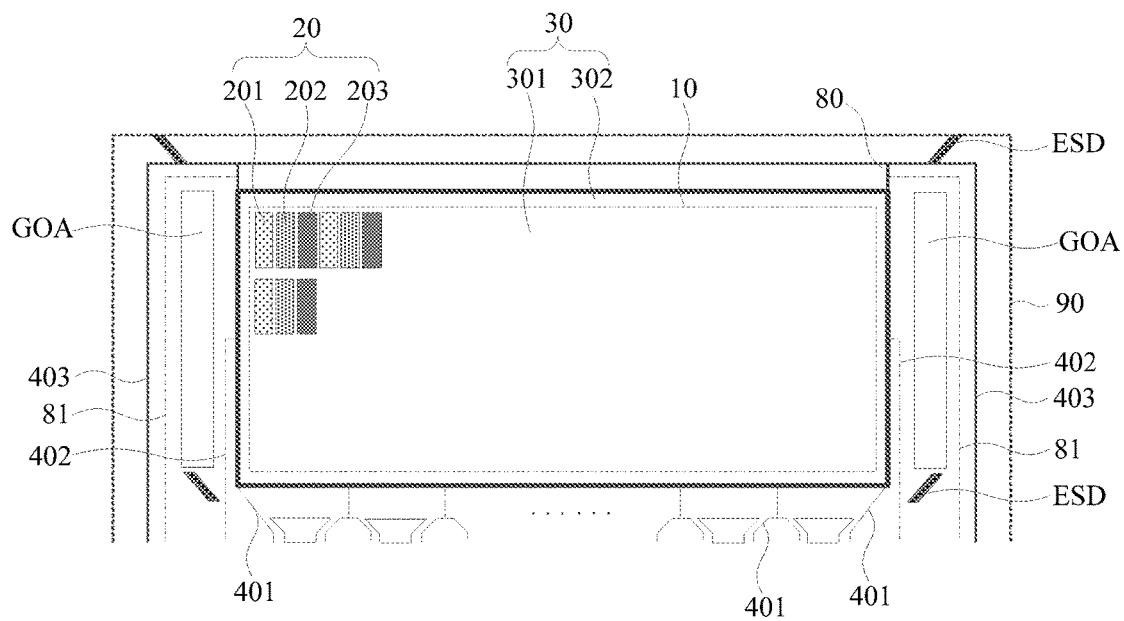
FIG. 1 is a first structural diagram of an array substrate according to an embodiment of the present disclosure.

As shown in FIG. 1, the present disclosure provides an array substrate, the array substrate includes: a display area 10 and a peripheral area surrounding the display area 10; the display area 10 is provided with a plurality of gate lines and a plurality of data lines, the gate lines and the data lines are crossed to define a plurality of sub-pixel regions (for example, a first sub-pixel region 201, a second sub-pixel region 202, and a third sub-pixel region 203) distributed in an array; the array substrate further includes:

a first electrode 30, the first electrode 30 includes a first portion 301 located in the display area 10 and a second portion 302 located in the peripheral area;

an electrode connection line (which may include a first electrode connection line 401, a second electrode connection line 402, and a third electrode connection line 403), the electrode connection line is located in the peripheral area, the electrode connection line is electrically connected to the second portion 302, and is configured to provide a first signal for the first electrode 30;

Exemplarily, the first electrode 30 is a block-shaped common electrode, and the common electrode includes a first portion 301 and a second portion 302 in an integrated structure, where the first portion 301 is located in the display area 10, and the second portion 302 is located in the peripheral area, the second portion 302 surrounds the first portion 301.

When the array substrate is applied to a 31.5-inch 8K display product with a resolution of 7680 (RGB)×4320, the size of the first electrode 30 and the length of the electrode connection line are both larger due to the larger size of the array substrate required, after the first signal is input to the array substrate by a driving chip, a resistance and capacitance load loaded on the first electrode 30 and the electrode connection line inside the array substrate has a greater delay effect on signal transmission (i.e., RC Loading); moreover, during the transmission of the first signal, capacitive coupling of a scanning signal transmitted on the gate line, capacitive coupling of a data signal transmitted on the data line, and capacitive coupling of a storage capacitor included in a driving circuit for driving the sub-pixel display in the array substrate are more serious, resulting in the display product prone to display unevenness.

In more detail, a periphery of the array substrate adopts VCOM0 signal, VCOM1 signal, VCOM2 signal input, the VCOM0 signal, VCOM1 signal, and VCOM2 signal are all the first signals. VCOM0 is input from a side of the array substrate close to the driving chip (IC) (that is, a DP side) input, and transmits the first signal of a proximal pixel of the array substrate close to the IC; VCOM1 is input from left and right sides of the array substrate to the middle of the array substrate; VCOM2 is input from the left and right sides of the array substrate to a side of the array substrate away from the IC (i.e. a DO Side), and transmits the first signal of a distal pixel of the array substrate.

Exemplarily, the electrode connection line is made by stacking a thicker Ti/Al/Ti metal layer, and a sheet resistance is in an order of 1E-2. The first electrode 30 is made of indium tin oxide (ITO) material, and the sheet resistance is in an order of 1E+1.

Figure 2:
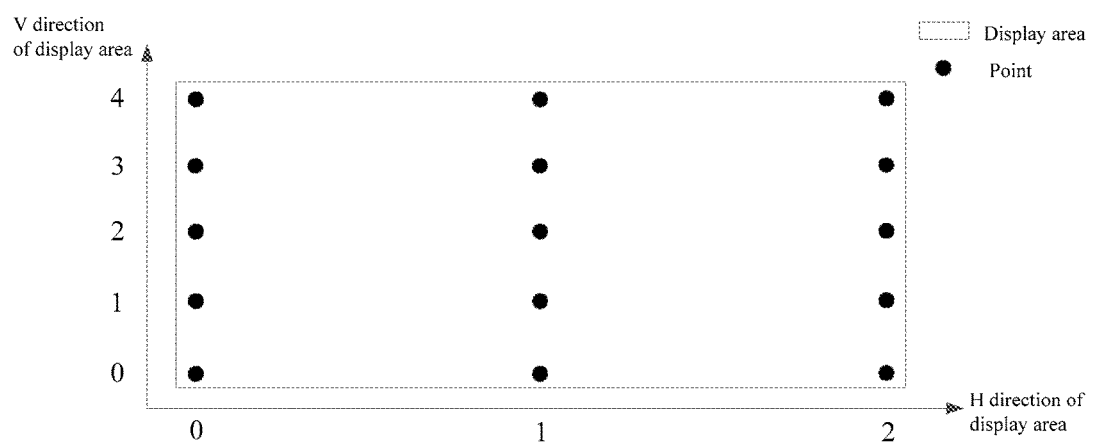
FIG. 2 is a schematic diagram of point selection according to an embodiment of the present disclosure.

In order to evaluate an impedance in a first signal transmission process, as shown in FIG. 2, point locations of the first electrode 30 corresponding to pixels in different positions of the display area 10 are selected, and a horizontal H direction of the array substrate corresponds to an abscissa of each point, and a vertical V direction of the array substrate corresponds to an ordinate of each point.

Figure 3:
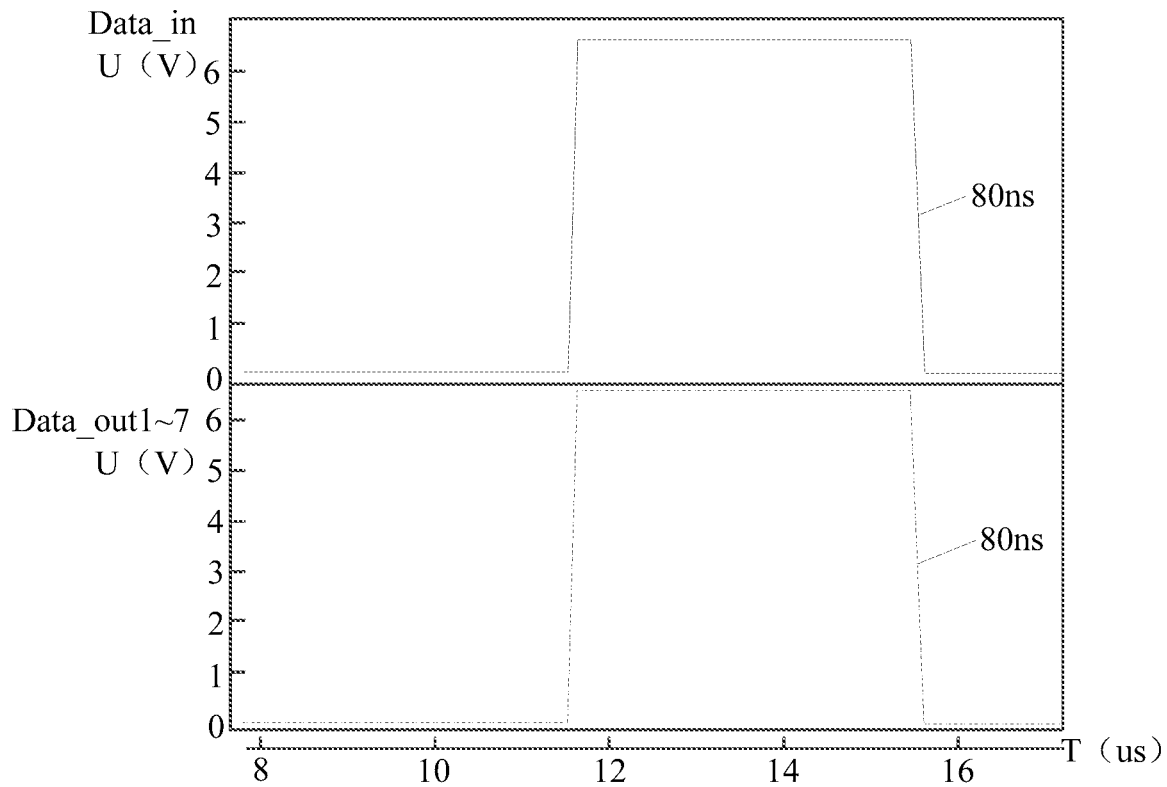
FIG. 3 is a schematic diagram of a first signal input by the IC and a first signal of seven points according to an embodiment of the present disclosure.

Because the electrode connection lines located in the peripheral area of the array substrate are made of thicker Ti/Al/Ti metal layers, (0,0), (0,1), (0,2), (0,3), (0,4); (1,0), (1,4); (2,0), (2,1), (2,2), (2,3), (2,4) and other points are close to the peripheral area, so an impedance of the corresponding first signal input is small. As shown in FIG. 3, it is a schematic diagram of a waveform of the first signal input by the IC, and a schematic diagram of a waveform of the first signal input of some of the above-mentioned points. Data_in is the first signal input by the IC, Data_out 1~7 are respectively the first signal in the display area 10 corresponding to the point (0,0), (0,1), (0,2), (0,3), (0,4); (1,0), (1,4). It can be seen that the rise time Tr and fall time Tf of Data_out 1~7 are consistent with the rise time Tr and fall time Tf of Data_in. Since the structures of the electrode connection lines on the left and right sides of the array substrate are the same, the resistances of the points (2,0), (2,1), (2,2), (2,3), (2,4) are consistent with the resistances of the points (0,0), (0,1), (0,2), (0,3), (0,4), and the rise time Tr and fall time Tf of the first signal corresponding to point (2,0), (2,1), (2,2), (2,3), (2,4) are also consistent with the rise time Tr and fall time Tf of Data_in. Therefore, it can be determined that the first signal corresponding to the pixel located in the display area 10 near the peripheral area in the array substrate is normally transmitted, and the first signal is uniform in the position of the display area 10 near the peripheral area in the array substrate. It should be noted that the above-mentioned rise time Tr and fall time Tf are generated at the moment when a display product is turned on and off when the array substrate is applied to the display product.

Figure 4:
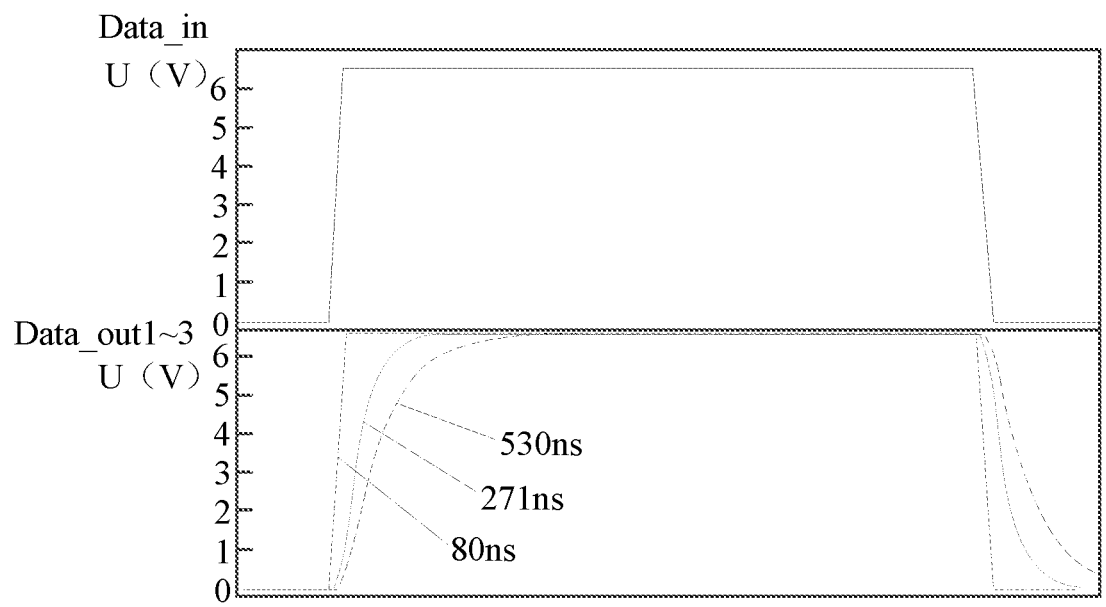
FIG. 4 is a schematic diagram of a first signal input by the IC and a first signal of three points according to an embodiment of the present disclosure.

When the first electrode 30 is made of ITO, the first signal at points (1,1), (1,2), (1,3) needs a larger area of ITO film to transmit, and after actually calculating the impedance of the first signal input corresponding to the three points, the waveform diagram of the first signal input at the points (1,1), (1,2), (1,3) shown in FIG. 4 is obtained, Data_out1~3 are respectively the first signal in the display area 10 corresponding to the three points (1,1), (1,2), (1,3). The Tr at the point (1,1) is 80 ns, the Tr at the point (1,2) is 271 ns, and the Tr at the point (1,3) is 530 ns. According to the experience of first signal uniformity of a non-touch display product, the Tr and Tf of the first signal transmission require that the proximal fluctuation is less than 2.5 times the fluctuation of the distal end to satisfy the transmission uniformity of the first signal. Therefore, when Tr is 80 ns at the proximal end, the distal end needs to be less than 200 ns to satisfy the signal uniformity requirement. Therefore, it can be concluded from the waveform in FIG. 4 that when the first signal inside the array substrate is only transmitted by the ITO film, it is easy to cause uneven display of the array substrate, and ultimately affect the display quality.

Figure 5:
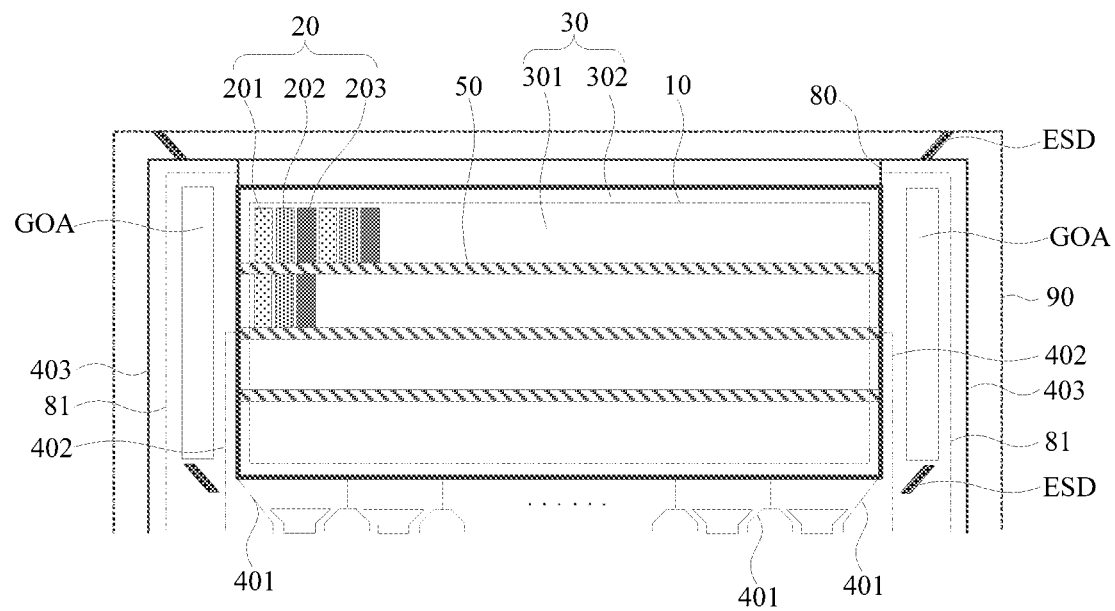
FIG. 5 is a second structural diagram of the array substrate according to an embodiment of the present disclosure.
Figure 6:
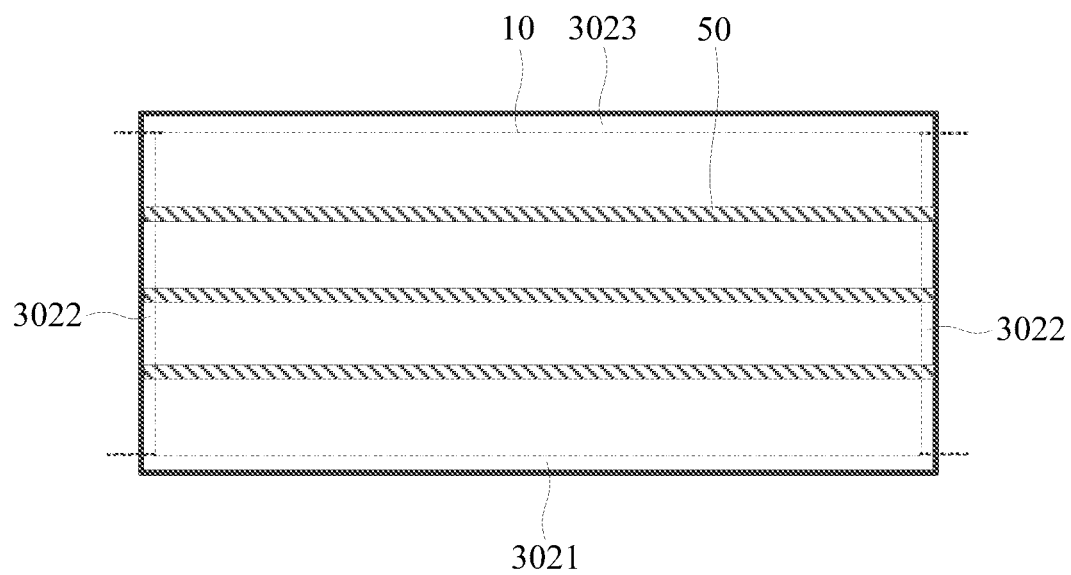
FIG. 6 is a schematic diagram of a first electrode and a compensation signal line in FIG. 5.
Figure 7:
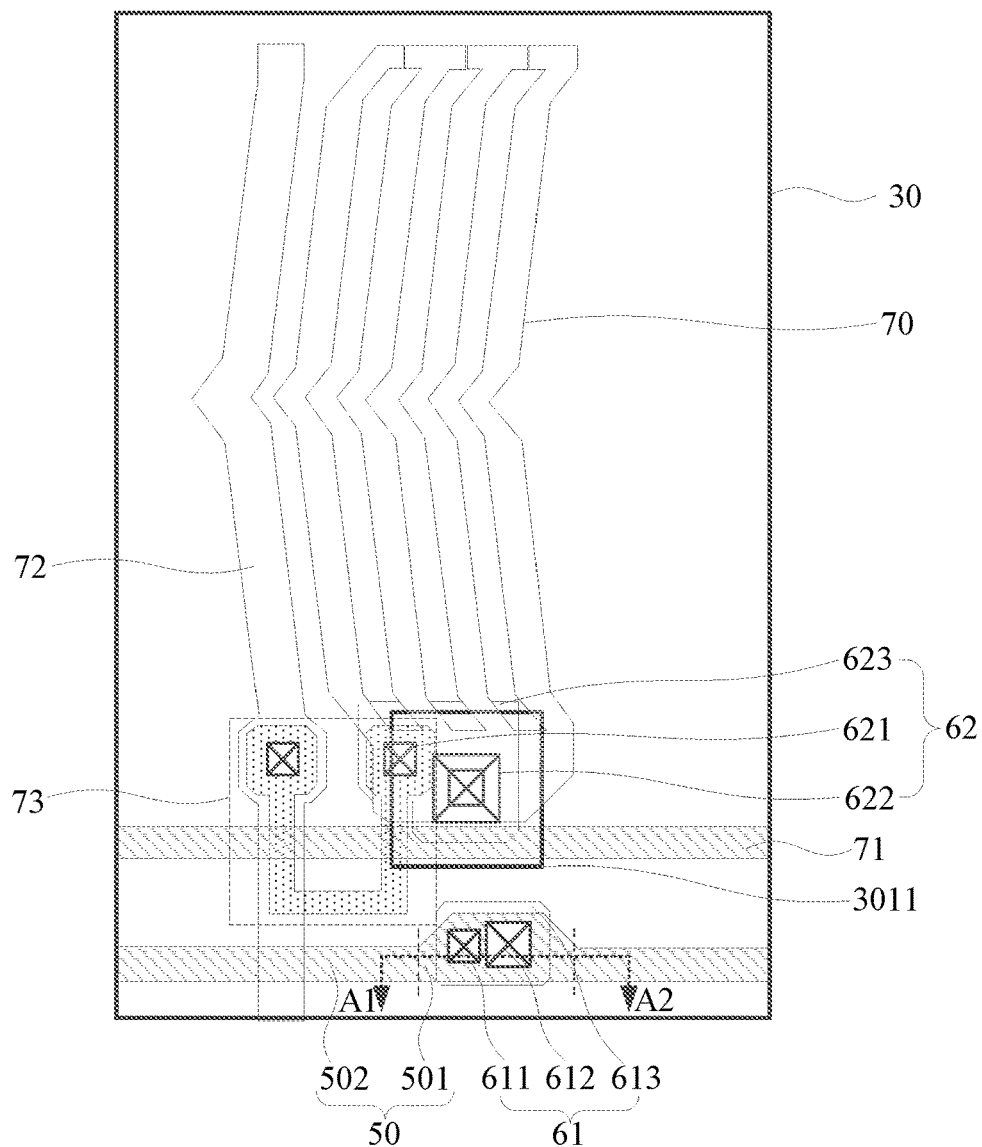
FIG. 7 is a schematic structural diagram of a sub-pixel according to an embodiment of the present disclosure.

Please refer to FIGS. 5 to 7, the embodiments of the present disclosure provide an array substrate, including: a display area 10 and a peripheral area surrounding the display area 10; the display area is provided with a plurality of gate lines 71 and a plurality of data lines 72, the gate lines 71 and the data lines 72 are crossed to define a plurality of sub-pixel regions distributed in an array; the array substrate further includes:

a first electrode 30, the first electrode 30 includes a first portion 301 located in the display area 10 and a second portion 302 located in the peripheral area;

an electrode connection line, the electrode connection line is located in the peripheral area, the electrode connection line is electrically connected to the second portion 302, and is configured to provide a first signal for the first electrode 30;

a plurality of compensation signal lines 50, at least part of the compensation signal lines 50 are located in the display area 10, and the compensation signal lines 50 are electrically connected to the first portion 301.

Specifically, at least part of the gate lines 71 extend in a first direction, and at least part of the data lines 72 extend in a second direction. Exemplarily, the first direction includes a horizontal direction, and the second direction includes a vertical direction.

The array substrate further includes driving circuits corresponding to the sub-pixel regions in a one-to-one manner. For example, the driving circuit includes a transistor 73 and a storage capacitor. A gate of the transistor 73 is electrically connected to a corresponding gate line 71, an input electrode of the transistor 73 is electrically connected to a corresponding data line 72, and an output electrode of the transistor 73 is electrically connected to a pixel electrode in a corresponding sub-pixel region. The pixel electrode is multiplexed as one plate of the storage capacitor, and the first electrode 30 is multiplexed as the other plate of the storage capacitor.

The first electrode 30 is a block-shaped common electrode, and the common electrode includes a first portion 301 and a second portion 302 in an integrated structure, where the first portion 301 is located in the display area 10, and the second portion 302 is located in the peripheral area. Exemplarily, the second portion 302 surrounds the first portion 301. When the array substrate is applied to a display product with non-touch function, the common electrode only provides a first signal (that is, a VCOM signal), and the first signal needs to ensure that the level transmitted in the display area 10 is consistent.

The array substrate includes a base, and a light-shielding layer, an active layer (P—Si may be used), a gate insulating layer, a gate metal layer, an interlayer insulating layer, a source and drain metal layer, a planarization layer, a C-ITO layer, a passivation layer, and a P-ITO layer, etc. The production of the light-shielding layer, active layer, gate metal layer, interlayer insulating layer, source and drain metal layer, planarization layer, C-ITO layer, passivation layer and P-ITO layer requires a total of 9 patterning processes (i.e. 9 mask process). The gate metal layer is used to form the gate of the transistor 73 included in the driving circuit and the gate line 71 in the array substrate. The source and drain metal layer is used to form the data lines 72 and some conductive patterns in the array substrate. The C-ITO layer includes the first electrode 30, and the P-ITO layer includes the pixel electrode. It is worth noting that the C-ITO layer and the P-ITO layer can interchange positions.

Exemplarily, the electrode connection lines and the source and drain metal layers are arranged in the same layer and made of the same material, and can be formed in a same patterning process. In the peripheral area, the electrode connection line and the second portion 302 are electrically connected through a via penetrating the planarization layer (for example, an organic resin layer).

The array substrate includes a plurality of compensation signal lines 50. For example, the extension directions of the compensation signal lines 50 are the same, and the plurality of compensation signal lines 50 are arranged at intervals in a direction perpendicular to the extension direction.

According to the specific structure of the above-mentioned array substrate, in the array substrate provided by the embodiments of the present disclosure, by arranging the plurality of compensation signal lines 50 to be electrically connected to the first portion 301, the resistance of the first electrode 30 is reduced, thereby the problem of large transmission delay of the first signal in the display area 10 is effectively improved, the rise time and fall time of the first signal at the moment of turn-on and turn-off are reduced, and the degree of capacitive coupling is improved; therefore, when the array substrate provided by the embodiment of the present disclosure is applied to a large-size and high-resolution display product, it can well ensure the uniformity of the first signal of the large-size display product in different display areas 10, thereby better improving display quality of the display product.

In some embodiments, the plurality of sub-pixel regions are divided into multiple rows of sub-pixel regions, and the compensation signal lines 50 correspond to at least one row of sub-pixel regions in a one-to-one manner; at least part of the compensation signal lines 50 are located in a corresponding row of sub-pixel regions, and in a corresponding row of sub-pixel regions, the compensation signal lines 50 are electrically connected to the first portion 301 through at least one first via structure.

Exemplarily, the plurality of compensation signal lines 50 correspond to the multiple rows of sub-pixels in a one-to-one manner, and at least part of each of the compensation signal lines 50 is located in a corresponding row of sub-pixel regions.

Each of the compensation signal lines 50 can be electrically connected to the first portion 301 through at least one first via structure.

As shown in FIG. 5 and FIG. 7, in some embodiments, each row of sub-pixel regions can form a plurality of pixel regions 20, and each of the pixel regions 20 includes at least two adjacent sub-pixel regions (such as a first sub-pixel region 201, a second sub-pixel region 202, and a third sub-pixel region 203); the compensation signal lines 50 are electrically connected to the first portion 301 through a plurality of first via structures 61, and the plurality of first via structures 61 are distributed in the plurality of pixel regions formed by a corresponding row of sub-pixel regions in a one-to-one correspondence.

Exemplarily, each row of sub-pixel regions can form a plurality of pixel regions, and each of the pixel regions includes at least two adjacent sub-pixel regions, and each sub-pixel region can only belong to one pixel region.

In the above arrangement, the plurality of first via structures are distributed in the plurality of pixel regions formed by the corresponding row of sub-pixel regions in a one-to-one correspondence, so that the plurality of first via structures correspondingly connected to each compensation signal line 50 can be evenly distributed.

The above arrangement allows all the compensation signal lines 50 to be electrically connected to the first portion 301 through the plurality of evenly distributed first via structures, thereby greatly improving the transmission uniformity of the first signal in the display area 10.

Figure 9:
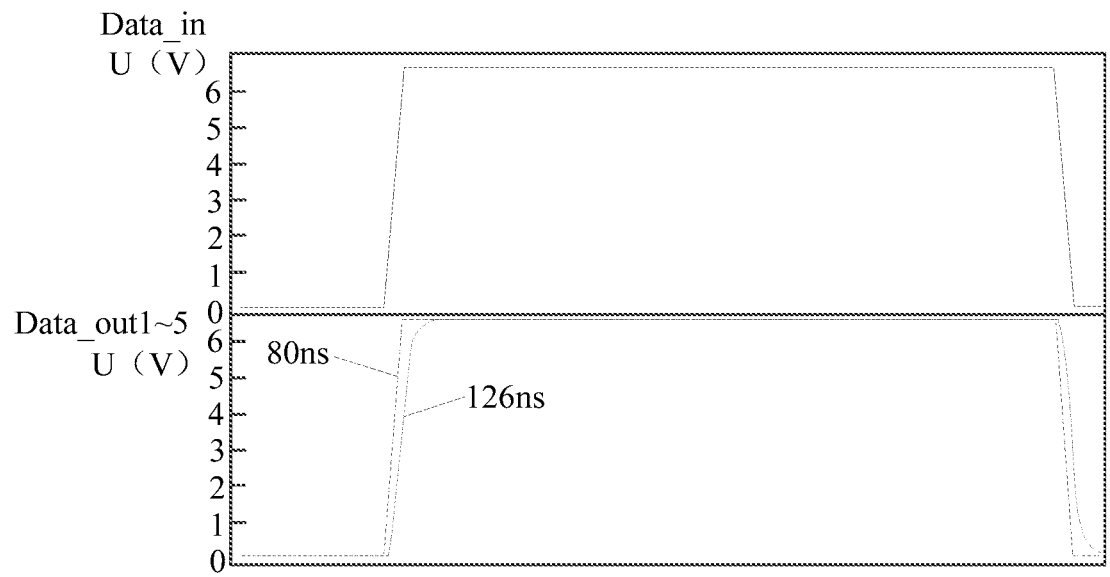
FIG. 9 is a schematic diagram of a first signal input by the IC and a first signal of five points according to an embodiment of the present disclosure.

In more detail, in the array substrate provided by the above embodiment, exemplarily, the first electrode 30 is made of ITO, the compensation signal line 50 is made of a first gate metal layer, and the first gate metal layer is made of a Ti/Al/Ti metal laminate structure, a sheet resistance of the compensation signal line 50 is lower than that of the first electrode 30 by more than one order of magnitude. The first signals at point (1, 0), (1,1), (1,2), (1,3), (1,4) are transmitted through the first electrode and the compensation signal line at the same time, and after calculating the impedance of the first signal input corresponding to the five points, the waveform diagram of the first signal input at the points (1,0), (1,1), (1,2), (1,3), (1,4) shown in FIG. 9 is obtained, Data_out1~5 are respectively the first signal in the display area 10 corresponding to the five points (1,0), (1,1), (1,2), (1,3), (1,4). Tr at points (1,0), (1,4) are both 80 ns, and Tr at points (1,1), (1,2), (1,3) are all 126 ns; it can be seen that in the array substrate according to the above embodiments, the Tr and Tf of the first signal transmission satisfy that the fluctuation of the distal end is 2.5 times or less than that of the proximal end. Therefore, the array substrate according to the above embodiment satisfies the transmission uniformity of the first signal when the first electrode 30 is compensated by the compensation signal line 50.

Figure 10:
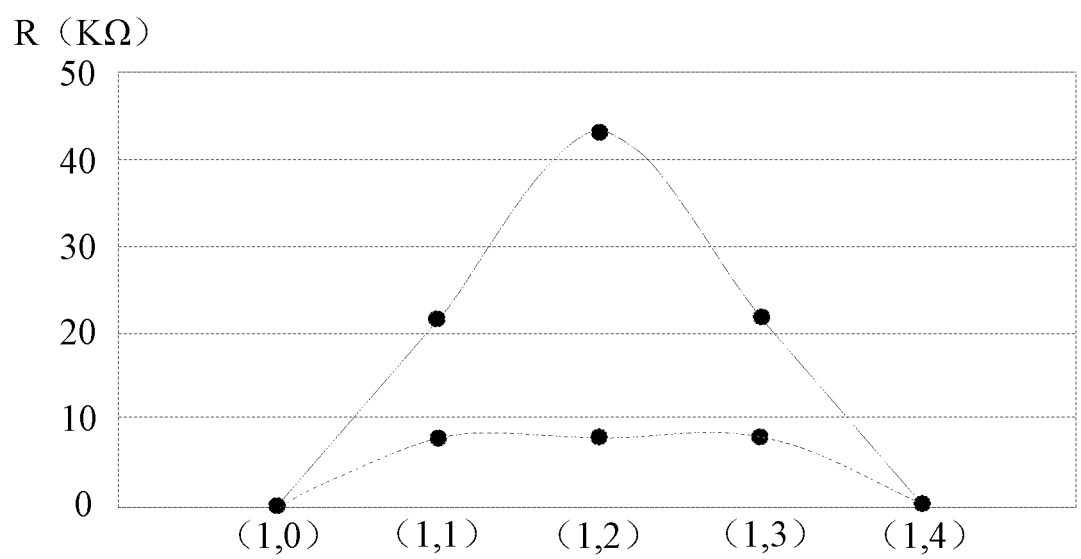
FIG. 10 is a schematic diagram of RC Loading generated at a proximal and distal ends of the first electrode before and after compensation using the compensation signal line.

As shown in FIG. 10, FIG. 10 illustrates the RC Loading generated at the proximal and distal ends of the first electrode 30 before the compensation signal line 50 is used, and the RC Loading generated proximal and distal ends of the first electrode 30 after the compensation signal line 50 is used. From the figure, it can be determined that after the compensation signal line 50 is used for compensation, the RC Loading generated at the proximal and distal ends of the first electrode 30 is significantly reduced.

As shown in FIG. 5, in some embodiments, the pixel region includes a first sub-pixel region 201, a second sub-pixel region 202, and a third sub-pixel region 203, and the first via structure in the pixel region is located in the first sub-pixel region 201 included in the pixel region.

Exemplarily, the first sub-pixel region 201 includes a blue sub-pixel region, the second sub-pixel region 202 includes a red sub-pixel region, and the third sub-pixel region 203 includes a green sub-pixel region.

Exemplarily, the first sub-pixel region 201 includes a red sub-pixel region, the second sub-pixel region 202 includes a green sub-pixel region, and the third sub-pixel region 203 includes a blue sub-pixel region.

Exemplarily, the first sub-pixel region 201 includes a green sub-pixel region, the second sub-pixel region 202 includes a blue sub-pixel region, and the third sub-pixel region 203 includes a red sub-pixel region.

The above arrangement makes that each pixel region is provided with the compensation signal line 50, and in each sub-pixel, the compensation signal line 50 can be electrically connected to the first portion 301 through the first via structure, thereby the transmission uniformity of the first signal in the display area 10 is better improved.

It should be noted that only some of the sub-pixel regions are shown in FIG. 5, and the actual sub-pixel regions will cover the entire display area 10.

As shown in FIG. 7, in some embodiments, the compensation signal lines 50 are electrically connected to the first portion 301 through a plurality of first via structures 61, and the plurality of first via structures 61 are distributed in a plurality of pixel regions formed included a corresponding row of sub-pixel regions in a one-to-one correspondence.

The above arrangement makes that each sub-pixel region is provided with the compensation signal line 50, and in each sub-pixel region, the compensation signal line 50 can be electrically connected to the first portion 301 through the first via structure 61, thereby the transmission uniformity of the first signal in the display area 10 is better improved.

Figure 8:
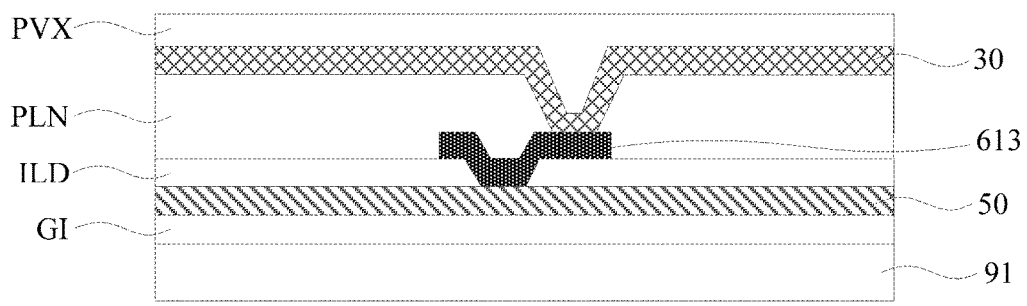
FIG. 8 is a schematic cross-sectional view along the A1A2 direction in FIG. 7.

As shown in FIG. 7 and FIG. 8, in some embodiments, the first via structure is provided including: a first via 611, a second via 612, and a first conductive pattern 613; the first conductive pattern 613 is located between the compensation signal lines 50 and the first portion 301, the compensation signal line 50 is electrically connected to the first conductive pattern 613 through the first via 611, and the first conductive pattern 613 is electrically connected to the first portion 301 through the second via 612.

Exemplarily, the first conductive pattern 613 and the source and drain metal layer are provided in the same layer and made of the same material, the first via 611 penetrates the interlayer insulating layer ILD, the compensation signal line 50 can be electrically connected to the first conductive pattern 613 through the first via 611, the second via 612 penetrates the planarization layer PLN, and the first conductive pattern 613 can be electrically connected to the first portion through the second via 612. It is worth noting that FIG. 8 also shows a base 91, a gate insulating layer GI and a passivation layer PVX, and other film layers may be included between the base 91 and the gate insulating layer GI, which are not shown in the figure.

In the array substrate according to the above embodiment, providing the compensation signal line 50 to be electrically connected to the first portion 301 through the first via structure, not only ensures that a Good electrical connection performance between the compensation signal line 50 and the first portion 301, better improves working stability of the array substrate; but also avoids the formation of too deep via between the compensation signal line 50 and the first portion 301, thereby reducing process difficulty of realizing electrical connection between the compensation signal line 50 and the first portion 301.

As shown in FIG. 7, in some embodiments, the compensation signal line 50 includes a third portion 501 and a fourth portion 502, a width of the third portion 501 is greater than a width of the fourth portion 502 along a direction perpendicular to an extension direction of the compensation signal line 50, and an orthographic projection of the first via 611 on the base of the array substrate overlaps an orthographic projection of the third portion 501 on the base; and/or an orthographic projection of the second via on the base overlaps the orthographic projection of the third portion 501 on the base.

Specifically, the compensation signal line 50 includes a third portion 501 and a fourth portion 502 in an integrated structure; exemplarily, the third portion 501 and the fourth portion 502 are alternately arranged.

Exemplarily, the orthographic projection of the first via on the base of the array substrate is located inside the orthographic projection of the third portion 501 on the base; and/or, the orthographic projection of the second via on the base is located inside the orthographic projection of the third portion 501 on the base.

The above arrangement can better ensure a connection performance between the compensation signal line 50 and the first portion 301.

In some embodiments, the first conductive pattern 613 and the data lines 72 are provided in the same layer and are made of same material.

Specifically, the first conductive pattern 613 and the data lines 72 are both formed on a surface of the interlayer insulating layer facing away from the base, and the first conductive pattern 613 and the data lines 72 are both made of Ti/Al/Ti metal laminate structure.

The above arrangement enables the first conductive pattern 613 and the data lines 72 to be simultaneously formed in a same patterning process, thereby effectively simplifying a manufacturing process of the array substrate and saving manufacturing cost of the array substrate.

In some embodiments, an extension direction of the compensation signal lines 50 is the same as an extension direction of the gate lines 71, and the compensation signal lines 50 and the gate lines 71 are provided in the same layer and are made of same material.

Exemplarily, both the compensation signal lines 50 and the gate lines 71 extend in a horizontal direction.

Exemplarily, the plurality of the compensation signal lines 50 and the plurality of the gate lines 71 are alternately arranged at intervals.

Specifically, the compensation signal lines 50 and the gate lines 71 are both formed on a surface of the gate insulating layer facing away from the base, and the compensation signal lines 50 and the data lines 71 are both made of Ti/Al/Ti metal laminate structure.

The above arrangement allows the compensation signal line 50 and the gate line 71 to be simultaneously formed in a same patterning process, without adding an additional patterning process specifically for making the compensation signal line 50, thereby effectively simplifying a manufacturing process of the array substrate and saving manufacturing cost of the array substrate. Therefore, when the array substrate according to the above embodiment includes the compensation signal line 50, it can also be manufactured through the mask process.

As shown in FIG. 7, in some embodiments, the array substrate further includes:

a plurality of second electrodes 70, the second electrodes 70 are located in the plurality of sub-pixel regions in a one-to-one correspondence, and the second electrodes 70 are located on a side of the first electrodes 30 facing away from the base of the array substrate; the first electrodes 30 are provided with a plurality of openings 3011 corresponding to the plurality of second electrodes 70 in a one-to-one manner;

a plurality of driving circuits corresponding to the plurality of second electrodes 70 in a one-to-one manner, the driving circuit is located between a corresponding second electrode 70 and the base of the array substrate, and a driving signal output terminal of the driving circuit is electrically connected to a corresponding second electrode 70 through a second via structure 62; the second via structure 62 includes a third via 621, a fourth via 622, and a second conductive pattern 623, and the second conductive pattern 623 is located between the driving signal output terminal and the second electrodes 70; the driving signal output terminal is electrically connected to the second conductive pattern 623 through the third via 621, and the second conductive pattern 623 is electrically connected to a corresponding second electrode 70 through the fourth via 622;

an orthographic projection of the fourth via 622 on the base of the array substrate is surrounded by an orthographic projection of a corresponding opening 3011 on the base.

Specifically, the second electrode 70 includes a pixel electrode, and the pixel electrode is formed into a structure with a slit (i.e., a slit structure).

Both the second electrodes 70 and the driving circuits correspond to the sub-pixel regions one to one. The driving circuit is located between a corresponding second electrode 70 and the base of the array substrate, the second electrode 70 is located on a side of the first electrode 30 facing away from the base of the array substrate, a driving signal output terminal of the drive circuit, that is, an output terminal of the transistor 73 is made of an active layer, and there is at least the gate insulating layer, the interlayer insulating layer, the planarization layer, the first electrode 30 and the passivation layer between the driving signal output terminal and the corresponding second electrode 70. Therefore, if the driving signal output terminal is to be electrically connected to the corresponding second electrode 70, it needs to pass through the gate insulating layer, the interlayer insulating layer, the planarization layer, the first electrode 30 and the passivation layer.

The array substrate further includes the second via structures, and the second via structures corresponds to the second electrodes 70 in a one-to-one manner. The second via structure includes a third via, a fourth via, and a second conductive pattern, and the second conductive pattern is located between the driving signal output terminal and the second electrode 70. Exemplarily, the second conductive pattern and the source and drain metal layer are provided in the same layer and made of the same material, and the third via penetrates the gate insulating layer and the interlayer insulating layer, so that the driving signal output terminal can be electrically connected to the second conductive pattern through the third via; the fourth via penetrates the planarization layer, the first electrode 30 and the passivation layer, so that the second conductive pattern can be electrically connected to a corresponding second electrode 70 through the fourth via.

Moreover, since the first electrode 30 is conductive, in order to avoid shorting the second electrode 70 and the first electrode 30, the first electrode 30 may be provided with a plurality of openings 3011 corresponding to the plurality of second electrodes 70 one to one, so that an orthographic projection of the fourth via passing through the first electrode 30 on the base can be surrounded by an orthographic projection of a corresponding opening 3011 on the base, and there is a certain distance between an inner wall of the fourth via and the boundary of the corresponding opening 3011.

In the array substrate according to the above embodiment, providing the driving signal output terminal to be electrically connected to a corresponding second electrode 70 through the second via structure, ensures a good electrical connection between the driving signal output terminal and the corresponding second electrode 70 and better improves the working stability of the array substrate.

In some embodiments, the array substrate further includes:

a plurality of second electrodes 70, the second electrodes 70 are located in the plurality of sub-pixel regions in a one-to-one correspondence, and the second electrodes 70 are located between the first electrodes 30 and the base of the array substrate;

a plurality of driving circuits corresponding to the plurality of second electrodes 70 in a one-to-one manner, the driving circuit is located between a corresponding second electrode 70 and the base of the array substrate, and a driving signal output terminal of the driving circuit is electrically connected to a corresponding second electrode 70.

Specifically, the plurality of second electrodes 70 may also be provided between the first electrode 30 and the base of the array substrate, so that a gate insulating layer, an interlayer insulating layer, and a planarization layer are spaced between the driving signal output terminal and the corresponding second electrode 70. Therefore, if the driving signal output terminal is to be electrically connected to the corresponding second electrode 70, it only needs to pass through the gate insulating layer, the interlayer insulating layer, and the planarization layer, and there is no need to form an opening on the first electrode 30.

The driving signal output terminal may be electrically connected to the corresponding second electrode 70 through a third via structure. Exemplarily, the third via structure includes a fifth via, a sixth via, and a third conductive pattern, and the third conductive pattern is located between the fifth via and the sixth via. Exemplarily, the third conductive pattern and the source and drain metal layer are provided in the same layer and made of the same material, and the fifth via penetrates the gate insulating layer and the interlayer insulating layer, so that the driving signal output terminal can be electrically connected to the third conductive pattern through the fifth via; the sixth via penetrates the planarization layer, so that the third conductive pattern can be electrically connected to the corresponding second electrode 70 through the sixth via.

In the array substrate according to the above embodiment, providing the driving signal output terminal to be electrically connected to the corresponding second electrode 70 through the third via structure, ensures a good electrical connection between the driving signal output terminal and the corresponding second electrode 70 and batter improves the working stability of the array substrate.

As shown in FIG. 5 and FIG. 6, in some embodiments, the array substrate further includes a first signal input terminal provided on a first side of the first electrode 30;

the second portion 302 surrounds the first portion 301, the second portion 302 includes a first sub-portion 3021, a second sub-portion 3022, and a third sub-portion 3023, the second sub-portion 3022 is located between the first sub-portion 3021 and the third sub-portion 3023 along an extension direction of the data lines 72;

the electrode connection line includes:

a first electrode connection line 401, the first electrode connection line 401 is electrically connected to the first sub-portion 3021 and the first signal input terminal, respectively;

a second electrode connection line 402, the second electrode connection line 402 is electrically connected to the second sub-portion 3022 and the first signal input terminal, respectively;

a third electrode connection line 403, the third electrode connection line 403 is electrically connected to the third sub-portion 3023 and the first signal input terminal, respectively.

Specifically, the first signal input terminal includes one or a plurality of ports. When the first signal input terminal includes one port, all the electrode connection lines are electrically connected to the one port, and receive electrical signals provided by the one port. When the first signal input terminal includes a plurality of ports, the plurality of ports all output a same first signal; for example, the first signal input terminal includes a plurality of first ports and two second ports and two third ports, the plurality of first ports are configured to output the VCOM0 signal, the two second ports are configured to output the VCOM1 signal, and the two third ports are configured to output the VCOM2 signal.

Exemplarily, the second portion 302 is formed in a back shape structure, the second portion 302 may be divided into three sub-portions, a first sub-portion 3021 is located on the first side, and the first sub-portion 3021 includes a side of the back-shaped structure on the first side, the third sub-portion 3023 is located on the second side of the first electrode 30, and the third sub-portion 3023 includes a side of the back-shaped structure on the second side, the second sub-portion 3022 includes a side located on a third side of the first electrode 30 and a side located on a fourth side of the first electrode 30.

In the above arrangement, the electrode connection line includes the first electrode connection line 401, the second electrode connection line 402, and the third electrode connection line 403, so that the first signal can be written to the first electrode 30 on the first side, the second side, and the position between the first side and the second side at the same time. Therefore, the transmission uniformity of the first signal in the display area 10 is further improved.

As shown in FIG. 5, in some embodiments, the electrode connection line includes a plurality of the first electrode connection lines 401, and the plurality of the first electrode connection lines 401 are arranged in sequence along an extension direction of the gate lines 71;

the electrode connection line includes two second electrode connection lines 402, one second electrode connection line 402 is located on a third side of the first electrode 30, and the other second electrode connection line 402 is located on a fourth side of the first electrode 30, the third side and the fourth side are opposite along the extension direction of the gate lines 71;

the third electrode connection line 403 surrounds the second, third, and fourth sides of the first electrode 30, and the second side and the first side are opposite along the extension direction of the data line 72, and the third electrode connection line 403 is electrically connected to both ends of the third sub-portion 3023 along the extension direction of the gate line 71, respectively.

Specifically, the electrode connection line includes a plurality of first electrode connection lines 401, and the plurality of first electrode connection lines 401 are arranged in sequence along an extension direction of the gate line 71; the first electrode connection lines 401 correspond to the first ports in a one-to-one manner, and each of the first electrode connection lines 401 is electrically connected to the first sub-portion 3021 and the corresponding first port, respectively.

The electrode connection line includes two second electrode connection lines 402, the two second electrode connection lines 402 correspond to the two second ports in a one-to-one manner, and one of the second electrode connection lines 402 is electrically connected to a corresponding second port and the second sub-portion 3022 located on the third side of the first electrode 30, and the other second electrode connection line 402 is electrically connected to a corresponding second port and the second sub-portion 3022 located on the fourth side of the first electrode 30. Exemplarily, the second electrode connection line 402 may be electrically connected to a middle part of the second sub-portion 3022.

Two ends of the third electrode connection line 403 are electrically connected to the two third ports in a one-to-one correspondence. The third electrode connection line 403 is respectively electrically connected to two ends of the third sub-portion 3023 along the extension direction of the gate line 71; for example, the third electrode connection line 403 is electrically connected to the two ends of the third sub-portion 3023 along the extension direction of the gate line 71 through two conductive portions 80, and an extension direction of the conductive portion 80 is the same as the extension direction of the data line 72. Exemplarily, the conductive portion 80 and the third electrode connection line 340 are formed as an integral structure.

In the array substrate according to the above embodiments, the first signal can be written to the first electrode 30 on the first side, the second side, the third side and the fourth side at the same time. Therefore, the transmission uniformity of the first signal in the display area 10 is further improved.

It should be noted that FIG. 5 also illustrates an electrostatic discharge structure ESD, a gate drive circuit GOA in the array substrate, a frame line 90 and a feed line 81 of the array substrate.

The embodiments of the present disclosure further provide a display device including the array substrate according to the above embodiments.

In the array substrate provided by the above embodiments, by arranging the plurality of compensation signal lines 50 to be electrically connected to the first portion 301, the resistance of the first electrode 30 is reduced, thereby the problem of large transmission delay of the first signal in the display area 10 is effectively improved, the rise time and fall time of the first signal at the moment of turn on and turn-off are reduced, and the degree of capacitive coupling is improved; therefore, when the array substrate provided by the above embodiments is applied to a large-size and high-resolution display product, it can well ensure the uniformity of the first signal of the large-size display product in different display areas 10, thereby better improving display quality of the display product.

Therefore, when the display device provided by the embodiments of the present disclosure includes the above array substrate, it also has the above beneficial effects, which will not be repeated here.

It should be noted that the display device may be any product or component with a display function, such as a TV, a monitor, a digital photo frame, a mobile phone, a tablet computer, and so on.

In some embodiments, the display device further includes a color filter substrate and a liquid crystal layer, the color filter substrate is arranged opposite to the array substrate, and the liquid crystal layer is located between the color filter substrate and the array substrate.

Specifically, the color filter substrate includes color resist patterns corresponding to the sub-pixel regions in the array substrate one to one, and at least part of orthographic projection of the color resist patterns on the array substrate is located in a corresponding sub-pixel regions.

The display device is a liquid crystal display device, and the first electrode 30 and the second electrode 70 in the array substrate jointly drive the liquid crystal in the liquid crystal layer to deflect, so as to realize the display function of the display device.

The embodiments of the present disclosure further provide a manufacturing method of an array substrate, the array substrate including a display area 10 and a peripheral area surrounding the display area 10; the manufacturing method includes:

fabricating a plurality of gate lines 71 and a plurality of data lines 72, the gate lines 71 and the data lines 72 are crossed to define a plurality of sub-pixel regions distributed in an array;

fabricating a first electrode 30, the first electrode 30 includes a first portion 301 located in the display area 10 and a second portion 302 located in the peripheral area;

fabricating an electrode connection line, the electrode connection line is located in the peripheral area, the electrode connection line is electrically connected to the second portion 302, and is configured to provide a first signal for the first electrode 30;

fabricating a plurality of compensation signal lines 50, at least part of the compensation signal line 50 is located in the display area 10, and the compensation signal lines 50 are electrically connected to the first portion 301.

In the array substrate manufactured by the manufacturing method according to the embodiments of the present disclosure, by arranging the plurality of compensation signal lines 50 to be electrically connected to the first portion 301, the resistance of the first electrode 30 is reduced, thereby the problem of large transmission delay of the first signal in the display area 10 is effectively improved, the rise time and fall time of the first signal at the moment of turn on and turn-off are reduced, and the degree of capacitive coupling is improved; therefore, when the array substrate manufactured by the manufacturing method according to the embodiments of the present disclosure is applied to a large-size and high-resolution display product, it can well ensure the uniformity of the first signal of the large-size display product in different display areas 10, thereby better improving display quality of the display product.

It should be appreciated that, each embodiment in the specification is described in a progressive manner, and same or similar parts between various embodiments may be referred to among the embodiments. Each embodiment focuses on the differences from other embodiments. In particular, as for the method embodiment, since it is basically similar to the product embodiment, the method embodiment is described relatively simply, and the relevant part may be referred to in the description of the product embodiment.

Unless defined otherwise, technical or scientific terms used in the present disclosure shall have general meanings as understood by those with ordinary skills in the art. Terms "first", "second" and similar terms used in the present disclosure do not indicate any order, quantity or priority, but are used only for distinguishing different components. An expression such as "include" or "have" indicates that a component or article preceding the term encompasses components, articles or other equivalents listed after the term, without excluding other components or articles. A term "connect", "attach" or other term with similar meaning is not limited to a physical connection or a mechanical connection, but may include an electrical connection, whether direct or indirect. "Up", "down", "left", "right" and the like are only used to represent a relative position relationship. When an absolute position of a described object is changed, the relative position relationship may also change correspondingly.

It should be appreciated that, when a component such as a layer, film, region or substrate is referred to as being located "above" or "below" another component, the component may be "directly" located "above" or "below" another component, or intermediary components may exist.

In the description of the foregoing embodiments, specific features, structures, materials, or characteristics may be combined in a suitable manner in any one or more embodiments or examples.

The aforementioned are merely specific implementations of the present disclosure, but the scope of the disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. An array substrate, comprising: a display area and a peripheral area surrounding the display area; the display area is provided with a plurality of gate lines and a plurality of data lines, the gate lines and the data lines are crossed to define a plurality of sub-pixel regions distributed in an array; the array substrate further comprises:
   a first electrode, the first electrode comprising a first portion located in the display area and a second portion located in the peripheral area;
   an electrode connection line, the electrode connection line is located in the peripheral area and electrically connected to the second portion, and is configured to provide a first signal for the first electrode; and
   a plurality of compensation signal lines, at least part of the compensation signal lines are located in the display area, and the compensation signal lines are electrically connected to the first portion;
   wherein the plurality of sub-pixel regions are divided into multiple rows of sub-pixel regions, and the compensation signal lines correspond to at least one row of sub-pixel regions in a one-to-one manner;
   at least part of the compensation signal lines are located in a corresponding row of sub-pixel regions, and in the corresponding row of sub-pixel regions, the compensation signal lines are electrically connected to the first portion through at least one first via structure;
wherein, the first via structure comprises: a first via, a second via, and a first conductive pattern;
the first conductive pattern is located between the compensation signal lines and the first portion, the compensation signal lines are electrically connected to the first conductive pattern through the first via, and the first conductive pattern is electrically connected to the first portion through the second via.

2. The array substrate according to claim 1, wherein each row of sub-pixel regions forms a plurality of pixel regions, and each of the pixel regions comprises at least two adjacent sub-pixel regions;
the compensation signal lines are electrically connected to the first portion through a plurality of first via structures, and the plurality of first via structures are distributed in the plurality of pixel regions formed by a corresponding row of sub-pixel regions in a one-to-one correspondence.

3. The array substrate according to claim 2, wherein, the pixel region comprises a first sub-pixel region, a second sub-pixel region, and a third sub-pixel region,
the first via structure in the pixel region is located in a first sub-pixel region of the pixel region.

4. The array substrate according to claim 1, wherein, the compensation signal lines comprise a third portion and a fourth portion, a width of the third portion is greater than a width of the fourth portion along a direction perpendicular to an extension direction of the compensation signal lines, and an orthographic projection of the first via on a base of the array substrate overlaps an orthographic projection of the third portion on the base; and/or an orthographic projection of the second via on the base overlaps the orthographic projection of the third portion on the base.

5. The array substrate according to claim 1, wherein, the first conductive pattern and the data lines are provided in the same layer and made of same material.

6. The array substrate according to claim 1, wherein, an extension direction of the compensation signal lines is the same as an extension direction of the gate lines, and the compensation signal lines and the gate lines are provided in the same layer and made of same material.

7. The array substrate according to claim 1, wherein, the array substrate further comprises:
a plurality of second electrodes, the second electrodes are located in the plurality of sub-pixel regions in a one-to-one correspondence, and the second electrodes are located on a side of the first electrodes facing away from the base of the array substrate; the first electrodes are provided with a plurality of openings corresponding to the plurality of second electrodes in a one-to-one manner;
a plurality of driving circuits corresponding to the plurality of second electrodes in a one-to-one manner, the driving circuit is located between a corresponding second electrode and the base of the array substrate, and a driving signal output terminal of the driving circuit is electrically connected to a corresponding second electrode through a second via structure; the second via structure comprises a third via, a fourth via, and a second conductive pattern, and the second conductive pattern is located between the driving signal output terminal and the second electrodes; the driving signal output terminal is electrically connected to the second conductive pattern through the third via, and the second conductive pattern is electrically connected to a corresponding second electrode through the fourth via;
an orthographic projection of the fourth via on the base of the array substrate is surrounded by an orthographic projection of a corresponding opening on the base.

8. The array substrate according to claim 1, wherein, the array substrate further comprises:
a plurality of second electrodes, the second electrodes are located in the plurality of sub-pixel regions in a one-to-one correspondence, and the second electrodes are located between the first electrodes and the base of the array substrate;
a plurality of driving circuits corresponding to the plurality of second electrodes in a one-to-one manner, the driving circuit is located between a corresponding second electrode and the base of the array substrate, and a driving signal output terminal of the driving circuit is electrically connected to a corresponding second electrode.

9. The array substrate according to claim 1, wherein, the array substrate further comprises a first signal input terminal provided on a first side of the first electrode;
the second portion surrounds the first portion, the second portion comprises a first sub-portion, a second sub-portion and a third sub-portion, the second sub-portion is located between the first sub-portion and the third sub-portion along an extension direction of the data lines;
the electrode connection line comprises:
a first electrode connection line, the first electrode connection line is electrically connected to the first sub-portion and the first signal input terminal, respectively;
a second electrode connection line, the second electrode connection line is electrically connected to the second sub-portion and the first signal input terminal, respectively;
a third electrode connection line, the third electrode connection line is electrically connected to the third sub-portion and the first signal input terminal, respectively.

10. The array substrate according to claim 1, wherein, the electrode connection line comprises a plurality of the first electrode connection lines, and the plurality of the first electrode connection lines are arranged in sequence along an extension direction of the gate lines;
the electrode connection line comprises two second electrode connection lines, one second electrode connection line is located on a third side of the first electrode, and the other second electrode connection line is located on a fourth side of the first electrode, the third side and the fourth side are opposite along the extension direction of the gate lines;
the third electrode connection line surrounds the second, third, and fourth sides of the first electrode, and the second side and the first side are opposite along the extension direction of the data lines, and the third electrode connection line is electrically connected to both ends of the third sub-portion along the extension direction of the gate lines, respectively.

11. A display device, comprising the array substrate according to claim 1.

12. The display device according to claim 11, further comprising a color filter substrate and a liquid crystal layer, wherein the color filter substrate is arranged opposite to the array substrate, and the liquid crystal layer is located between the color filter substrate and the array substrate.

13. A manufacturing method of an array substrate, the array substrate comprising a display area and a peripheral area surrounding the display area; the method comprises:

fabricating a plurality of gate lines and a plurality of data lines, the gate lines and the data lines are crossed to define a plurality of sub-pixel regions distributed in an array;

fabricating a first electrode, the first electrode comprising a first portion located in the display area and a second portion located in the peripheral area;

fabricating an electrode connection line, the electrode connection line is located in the peripheral area, the electrode connection line is electrically connected to the second portion, and is configured to provide a first signal for the first electrode;

fabricating a plurality of compensation signal lines, at least part of the compensation signal line is located in the display area, and the compensation signal lines are electrically connected to the first portion;

wherein the plurality of sub-pixel regions are divided into multiple rows of sub-pixel regions, and the compensation signal lines correspond to at least one row of sub-pixel regions in a one-to-one manner;

at least part of the compensation signal lines are located in a corresponding row of sub-pixel regions, and in the corresponding row of sub-pixel regions, the compensation signal lines are electrically connected to the first portion through at least one first via structure;

wherein, the first via structure comprises: a first via, a second via, and a first conductive pattern;

the first conductive pattern is located between the compensation signal lines and the first portion, the compensation signal lines are electrically connected to the first conductive pattern through the first via, and the first conductive pattern is electrically connected to the first portion through the second via.

* * * * *